Nov. 2, 1965   F. C. GLEASON   3,215,251
APPARATUS FOR ALIGNING AND ORIENTING
ELONGATE CYLINDRICAL OBJECTS
Filed Jan. 2, 1964   4 Sheets-Sheet 2

INVENTOR
FRED C. GLEASON
BY
ATTORNEY

Nov. 2, 1965 F. C. GLEASON 3,215,251
APPARATUS FOR ALIGNING AND ORIENTING
ELONGATE CYLINDRICAL OBJECTS
Filed Jan. 2, 1964 4 Sheets-Sheet 3
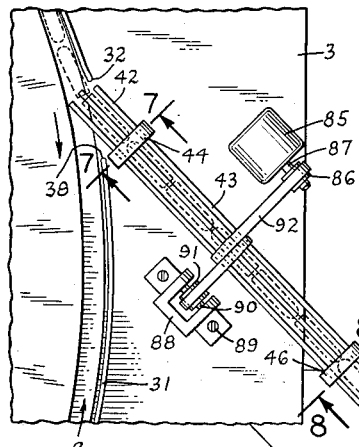
FIG.5.
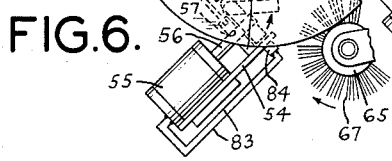
FIG.6.
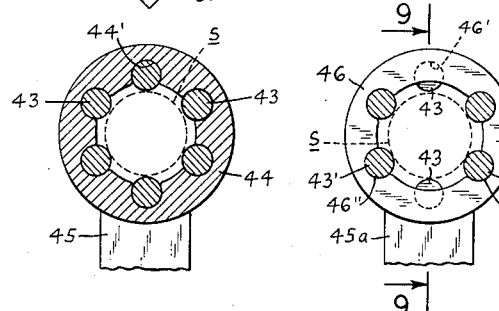
FIG.7. FIG.8. FIG.9.
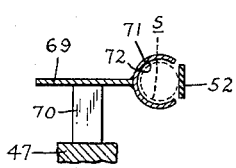
FIG.10. FIG.12.
FIG.11.
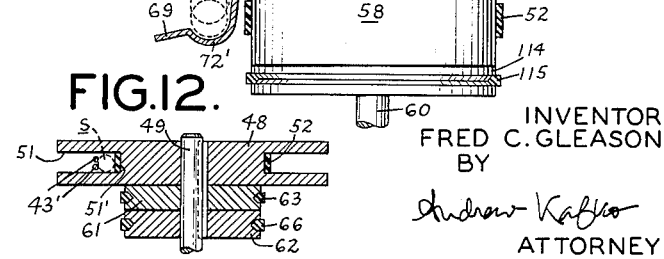
INVENTOR
FRED C. GLEASON
BY
Andrew Kafko
ATTORNEY Nov. 2, 1965  F. C. GLEASON  3,215,251
APPARATUS FOR ALIGNING AND ORIENTING
ELONGATE CYLINDRICAL OBJECTS
Filed Jan. 2, 1964  4 Sheets-Sheet 4

INVENTOR
FRED C. GLEASON
BY
Andrew Kafko
ATTORNEY

United States Patent Office 3,215,251
Patented Nov. 2, 1965

3,215,251
APPARATUS FOR ALIGNING AND ORIENTING
ELONGATE CYLINDRICAL OBJECTS
Fred C. Gleason, Cannondale, Conn., assignor to American Home Products Corporation, New York, N.Y., a corporation of Delaware
Filed Jan. 2, 1964, Ser. No. 335,073
12 Claims. (Cl. 198—33)

This invention relates generally to apparatus for orienting objects of substantially similar configuration. More particularly, the invention relates to apparatus for automatically aligning and orienting a series of elongate objects each consisting essentially of a cylindrical body having a beveled end and a blunt end, whereby the objects have a cartridge-like shape.

Although not restricted thereto, the invention is particularly useful for aligning and orienting cylindrically-contoured suppositories to permit automatic and continuous placing thereof individually into the receptacles or slots of the rotating platen of a wrapping machine. With the increased acceptance of the individually wrapped medicated suppository, it has become an increasingly greater -problem to provide dependable, rapidly operating, substantially fully automatic means for the preparatory aligning and orienting of large quantities of suppositories to replace conventional laborious, time-consuming and costly manual operations for continuously loading the rotating platen of a wrapping machine.

With the foregoing in view, it is a primary object of the present invention to provide a simple, highly efficient and economic apparatus for automatically aligning and orienting a plurality of elongate cartridge-shaped objects preparatory to the further processing of such objects.

It is another object of the invention to provide apparatus of the character referred to above which is of particular utility for aligning and orienting generally cylindrical suppositories and similar objects preparatory to positioning such suppositories or objects into a series of receptacles therefor, such as the slots in a rotating platen of a wrapping machine.

It is another object to provide apparatus of the character referred to above wherein the cylindrical objects may be dumped haphazardly onto an operative surface of -the apparatus and yet are thereafter automatically properly aligned and oriented at the discharge end of the apparatus.

It is another object of the invention to provide such apparatus which positively assures aligning of the objects prior to orientation thereof and, to this purpose, causes recycling, on the operative surface of the apparatus, those objects which perchance have not been properly aligned, before such objects are transported to the orienting and discharge end of the apparatus.

Yet another object of the invention is to provide apparatus of the nature described which has the various components thereof coactively and spatially related to each other, whereby the aligning and orienting functions thereof are positively assured and are performed within a minimum space.

It is yet another object to provide an apparatus that is capable of furnishing aligned and oriented objects at the discharge end of the device at a rapid and continuous rate.

Another object is to provide apparatus of the nature described in which the operating characteristics thereof may be altered by merely adjusting the attitude of a component thereof with respect to the vertical.

Still another object is to provide aligning and orienting apparatus that is substantially jam-free both at the aligned-object delivery and the final oriented-object delivery sections thereof.

Other objects and advantages of the invention will become apparent as a result of a better understanding thereof upon reference to the description that follows.

In its broader aspect, the invention resides in apparatus for aligning elongate cylindrical objects, wherein the apparatus comprises: a rotatable disc, means supporting the rotatable disc in an inclined plane, a peripheral shoulder extending downwardly from the upper surface of the disc in substantially the direction of the axis thereof, the shoulder terminating in a substantially radially extending lower peripheral ledge, guide surface means mounted closely adjacent the ledge of the disc and extending around the disc at least from the lower region to the upper region thereof in the direction of rotation of the disc, to define in cooperation with the shoulder and the lower ledge, a groove having cross-sectional dimensions adapting it to receive and maintain the cylindrical objects therein in alignment and substantially tangentially of the shoulder, and conduit means communicating with the groove in the upper region of the disc and having interior cross-sectional dimensions adapting it for receiving the aligned objects from the groove and conducting them in such disposition to the orienting mechanism.

In a preferred embodiment of the invention particularly useful for aligning and orienting elongate cylindrical objects having a beveled end and a blunt end, the apparatus further comprises: means for adjustably tilting the disc and the guide surface associated therewith as a unit with respect to the horizontal on a supporting structure, a wall for the conduit means which comprises separate rods extending in the direction of the axis of the conduit means and means for rotating these rods. In further accordance with this preferred embodiment of the invention, the conduit means function as a gravity chute which communicates at its lower end with a deep peripheral slot provided in a second disc mounted for rotation in a plane which may either be inclined, as is that of the first rotatable disc, or substantially vertically disposed; an endless belt is looped at one end thereof around the innermost interior surface of the peripheral slot in the second disc, and at the other end thereof, around a pulley opposite the peripheral area of the second disc remote from the peripheral area thereof where the gravity chute communicates with the peripheral slot therein; a partial continuation of the chute conducts objects to the lower region of the slot; and a stop plate extends athwart the terminal region of the chute continuation in the path of objects moving thereon. The stop plate is provided with an aperture which is located precisely in the path of the objects conducted on the chute continuation and is dimensioned to receive part of the beveled end of the objects when such end abuts the stop plate and to exclude the larger dimensioned blunt end of the objects when such end abuts the stop plate. An intermittently actuated extendable push-bar is positioned to reciprocate across the path of the objects when they are in abutment with the stop plate, the push-bar being positioned to push the objects inwardly of the slot and into abutment with the endless belt in the slot. Additionally, a rotatable impeller is provided adjacent the endless belt and the region of the push-bar for receiving objects pushed thereby off the chute and stop plate and directing them into abutment with the endless belt and urging them therealong and into a discharge conduit provided on the other side of the rotatable impeller and formed in part by the web of the endless belt and in part by a vibratory surface means.

Several embodiments of the invention will now be described with reference to the accompanying drawings wherein.

Figure 1:
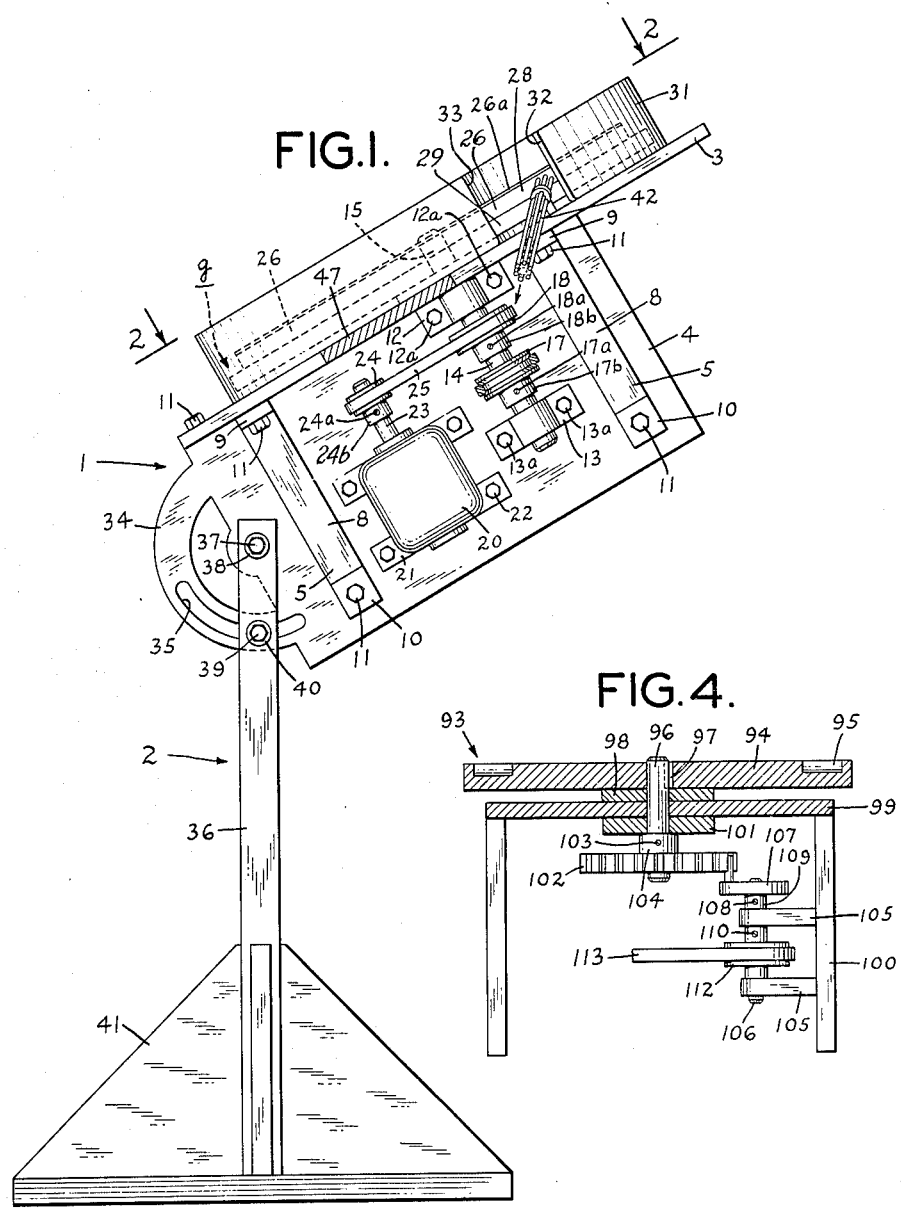
FIG. 1 is a side elevational view of the aligning mechanism of an apparatus in accordance with a preferred embodiment of the invention and shown apart from the orienting and discharging structure thereof.
Figure 2:
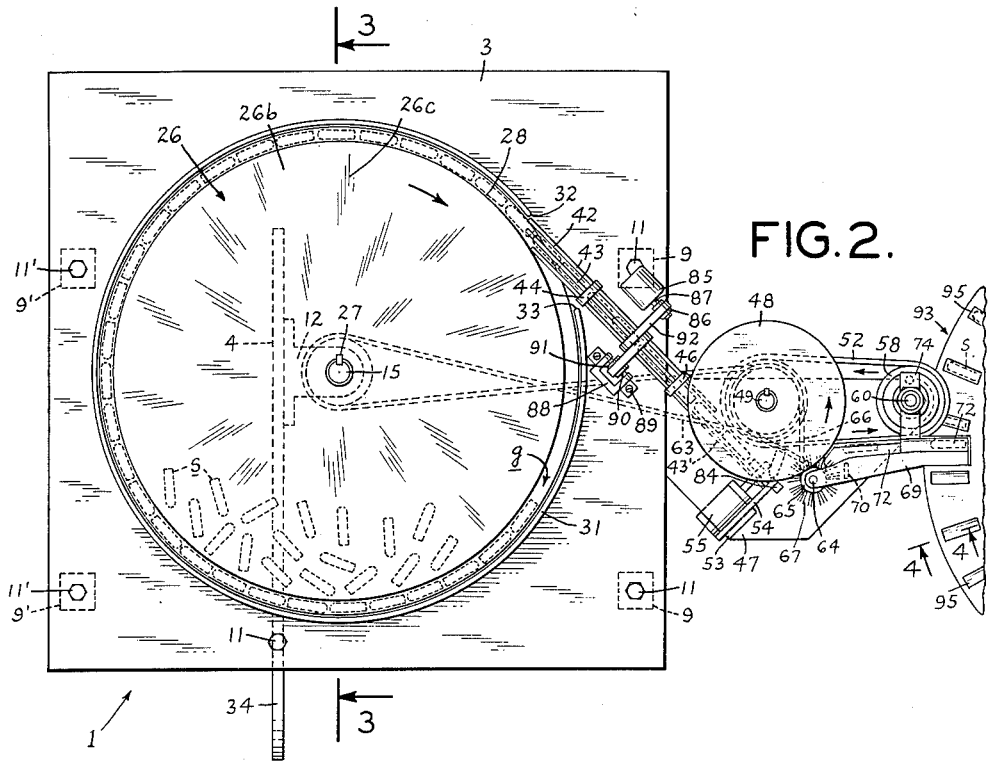
FIG. 2 is a plan of the upper operational portion of the entire apparatus (shown only partially in FIG. 1), the entire apparatus being viewed in the direction of arrows 2—2 of FIG. 1, and a rotatable platen, to which the apparatus discharges, being shown in normal plan.
Figure 3:
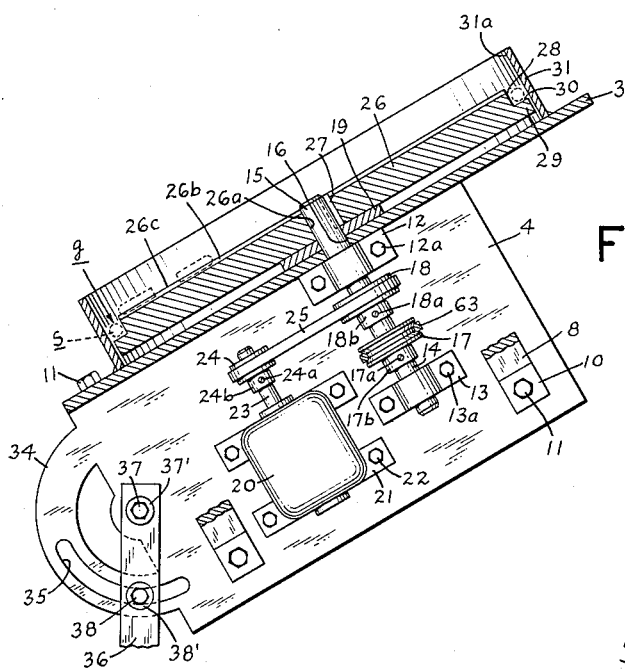
Figure 13:
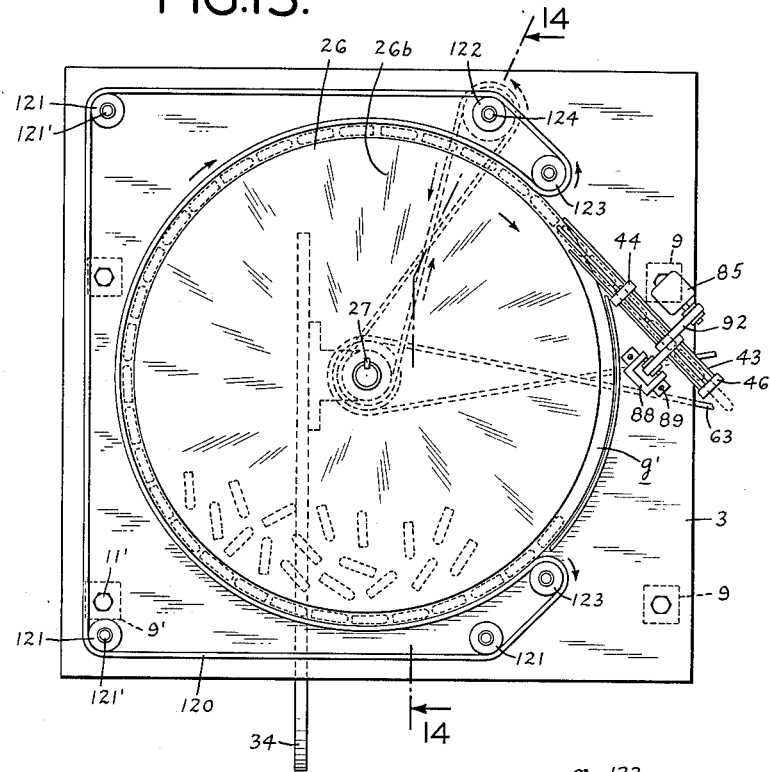
Figure 14:
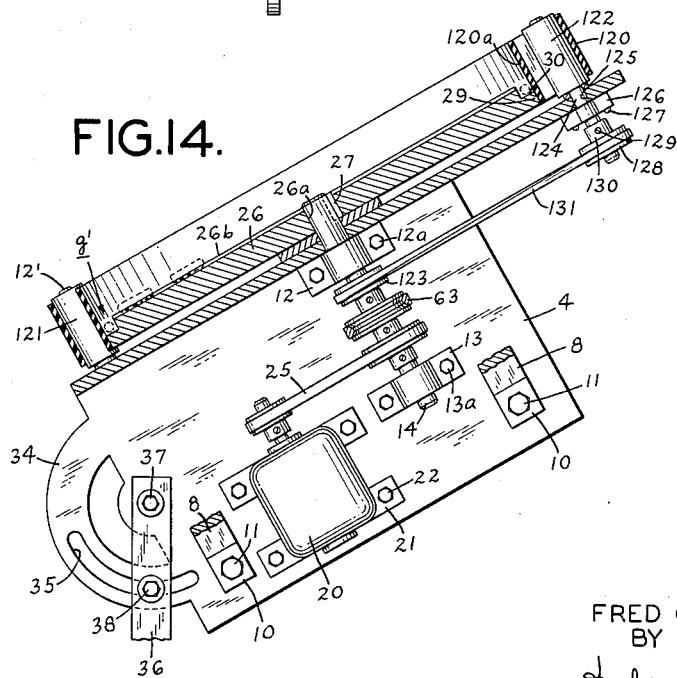

FIG. 3 is a substantially vertical section of the aligning mechanism shown in FIGS. 1 and 2, taken generally along line 3—3 of the latter figure and showing the disposition of cylindrical cartridge-shaped suppositories being handled thereby, several of which suppositories are shown in broken lines on the upper surface of the disc and in the upper and lower regions, respectively, of the groove formed by the shoulder and ledge of the disc and the peripheral guiding surface adjacent the ledge;

FIG. 4 is a vertical cross-section of the rotatable platen shown only in part in FIG. 2, the section being taken through the entire platen structure on section line 4—4 of FIG. 2;

FIG. 5 is a plan view of the apparatus taken in substantially the identical directions as in FIG. 2, but showing a greatly enlarged fragment thereof to better illustrate the structures of the gravity chute leading from the disc, the orienting and discharge mechanism handling an unoriented suppository, and the relationship of the discharge mechanism to the slots in the rotatable platen;

FIG. 6 is a fragmentary plan view of the orienting mechanism shown in FIG. 5 to indicate the operation thereof when an aligned object arrives thereat in already oriented disposition;

FIG. 7 is an enlarged cross-sectional view of the gravity chute shown in FIG. 5, the section being taken on line 7—7 of the latter figure;

FIG. 8 is another cross-section of the gravity chute of FIG. 5, this section being taken on line 8—8 of the latter figure;

FIG. 9 is an axial section of the gravity chute taken on line 9—9 of FIG. 8;

FIG. 10 is an enlarged cross-section of the guide tube of the orienting mechanism, taken on line 10—10 of FIG. 5;

FIG. 11 is an enlarged cross-section of the discharge end of the guide tube, the section being taken on line 11—11 of FIG. 5 through the vibratory discharge mechanism associated with the guide tube;

FIG. 12 is a diametrical cross-section of the peripherally slotted disc of the orienting mechanism shown in FIGS. 2 and 5, the section being taken on line 12—12 of the latter figure;

FIG. 13 is a plan view of an aligning mechanism in accordance with another embodiment of the invention, the view being taken in a direction similar to that indicated for FIG. 2 by the arrows 2—2 of FIG. 1, in this case not showing the remainder of the apparatus which may be similar to that illustrated in FIGS. 2–12; and FIG. 14 is a substantially vertical section of the aligning mechanism of FIG. 13, taken along line 14—14 of the latter figure.

The embodiment of the invention disclosed in FIGS. 1–12 in the drawings comprises an upper aligning assembly 1 mounted on a supporting structure 2. Assembly 1 comprises a platform 3, to the bottom of which is attached at right angles thereto, a main supporting bracket 4 by means of bolts 11. A longer pair of auxiliary angle brackets 5 and a shorter pair of auxiliary angle brackets (not visible) are provided on either side of main mounting bracket 4, respectively, for strengthening the entire assembly 1. As seen in FIG. 1, longer auxiliary brackets 5 each comprises an angle bar 8 having bent therefrom at the upper end thereof, a foot 9, and at the lower end a foot 10, which are respectively adapted to abut a corner region of the bottom surface of platform 3 and the opposed face of mounting bracket 4, and are retained in such relationship by means of bolts 11. The shorter pair of auxiliary brackets are similarly constructed and attached to main mounting bracket 4 and the bottom surface of platform 3. The upper feet of these shorter auxiliary brackets and the bolts therefor are indicated in FIG. 2 by reference numerals 9' and 11', respectively.

A pair of bearing members 12 and 13 are mounted, by means of respective pairs of bolts 12a and 13a, on the surface of mounting bracket 4 to which longer auxiliary brackets 5 are attached. Rotatably mounted in said bearing members 12 and 13 is a shaft 14, the upper end 15 of which, as best seen in FIG. 3, extends through an aperture 16 provided in platform 3 and terminates above the upper surface of platform 3. Shaft 14, along its length below platform 13, has mounted thereon a first lower pulley 17 and a second upper pulley 18. Pulleys 17 and 18 are respectively affixed to the shaft 14 by set screws 17a and 18a in respective collars 17b and 18b. Upper end 15 of shaft 14 has a spacer 19 thereon in abutment at its lower surface with the upper surface of platform 3.

An electric motor 20 is mounted on the same side of main mounting bracket 4, being affixed thereto by bolts 22 extending through mounting feet 21 of said motor. Mounted on the drive shaft 23 of electric motor 20, and in alignment with upper pulley 18 affixed to shaft 14, is a pulley 24 affixed to said shaft 23 by a set screw 24a in collar 24b. An endless drive belt 25 is looped around pulleys 24 and 18.

A rotatable disc 26 having a central aperture 26a is set thereby on the upper end 15 of shaft 14 and in bearing abutment with spacer 19. A key 27 fitted into opposed key slots in the upper end 15 of shaft 14 and in the aperture 26a of disc 26, respectively, affixes the latter to shaft 14 for rotation therewith. The upper surface 26b of disc 26 is provided with ridges 26c.

Disc 26 has at its periphery and extending downwardly from the upper surface 26b thereof, a shoulder 28. Shoulder 28 terminates in a lower ledge 29 which provides a radially extending annular surface 30. Surrounding disc 26, is a guiding and retaining member 31, which is affixed to platform 3 and has the interior surface 31a thereof closely adjacent the peripheral edge of ledge 29, whereby there is defined an annular groove g. As appears in FIG. 2, guiding and retaining member 31 incompletely circumscribes disc 26, terminating at spaced edges 32 and 33 in the upper region of disc 26.

Integral with the lower edge of main supporting bracket 4 (as viewed in FIGS. 1 and 3) is an arcuate extension 34 provided with a slot 35 extending for substantially the lower quadrant of said arcuate extension. Supporting structure 2 comprises an upright stanchion 36 in turn supported in a base 41. A bolt 37 extending through a washer 8 passes through the uppermost portion of stanchion 36 and through main supporting bracket 4, whereby the entire upper assembly 1 is pivotally mounted on a horizontal axis on supporting structure 2. A second bolt 39 passes through a lock washer 40 and also extends through stanchion 36 and passes through slot 35. A lock nut (not visible) on bolt 39 completes a locking structure whereby assembly 1 may be fixed at the inclination desired on supporting structure 2.

A conduit 42 communicates with groove g provided at the periphery of disc 26, and extends substantially tangentially of the latter through the opening in peripheral guide member 31 provided between spaced terminal edges 32 and 33 thereof. Conduit 42 is defined by a plurality of rotatable rods 43. Said rods 43 are supported for rotation in a first bearing member 44 supported on platform 3 by bracket 45. As shown in FIG. 7, bearing member 44 maintains six rotatable rods 43 in spaced position in respective bearing apertures 44' to form a chute of circular cross-section adapted to accommodate suppositories s therein with the surface of the latter in contact with the inner peripheral surfaces of the rotatable rods. The distal ends of the uppermost and lowermost rods 43, as viewed in FIG. 7, are retained by and terminate in bearing apertures 46' provided in a second bearing support 46, best seen in FIG. 8. The remaining four rods 43 are rotatably retained in bearing apertures 46" but have extensions 43' extending therethrough and beyond. Bearing member 46 is supported on a bracket 45a affixed to an auxiliary platform 47 which is supported at one end thereof by platform 3.

As will readily appear to those skilled in the art, while the five upper rods 43 may overlie groove g of disc 26, the lowermost rod 43 is foreshortened so that it may be positioned adjacent the peripheral edge of ledge 29 of disc 26, whereby the upper peripheral surface of said lowermost rod may be substantially in the plane of the upper surface 30 of ledge 29. By this arrangement, the suppositories s may be positively directed from groove g into conduit 42 by said five upper rods 43 without any hindrance by said lowermost rod.

A small electric motor 85 is mounted on platform 3 adjacent chute 42. Electric motor 85 is provided with a pulley 86 on its drive shaft 87. On the side of chute 42 opposite that at which electric motor 85 is located, there is mounted on platform 3 a generally C-shaped bracket 88 by means of screws 89. A shaft 90 is supported in C-shaped bracket 88 and has rotatably mounted thereon an idler pulley 91. An endless belt 92 is looped around pulleys 86 and 91 and also once around rods 43 thereby to engage drivingly each of said rods.

As best appears in FIG. 5, and with reference to FIG. 12, a disc 48 provided with a deep peripheral slot 48' is affixed to a shaft 49 for rotation therewith, by a key 50. Shaft 49 is rotatably mounted (in bearing means not visible) on auxiliary platform 47 attached to platform 3. Disc 48 is positioned by shaft 49 so that the periphery of the former is closely adjacent bearing bracket 46 for rods 42. The upper two of the four rods 43 that continue through bracket 46, as best appears in FIG. 5, extend until they are almost in abutment with an endless belt 52 maintained on the interior surface 51' of slot 51 in disc 48. The lower two of the rods 43 that are opposite those just mentioned extend to form almost a complete chord within slot 51. Also affixed to shaft 49 for rotation therewith are a pair of pulleys 61 and 62 positioned immediately beneath disc 48 (FIG. 12) and provided for purposes that will appear hereinafter. Thus, pulley 61 is drivingly connected with pulley 17 on shaft 14 by means of a crossed-over endless belt 63. Pulley 62, in turn, serves as driving means for an indexing table described herein in due course.

Mounted by means of a support 53 on auxiliary platform 47 is a stop member 54. Attached to the lower portion of stop member 54 is a solenoid 55 having the core piece 56 thereof extending substantially in a direction parallel to stop member 54 and also into slot 51 in disc 48, as best appears in FIGS. 5 and 6. Stop member 54 has at its upper region an extension piece 54a affixed perpendicularly thereto and in effect forming a non-rotatable continuation of the lower pair of rotatable rods 43 of conduit 42. Extension piece 54a is provided with an aperture 57 through which core piece 56 of solenoid 55 may extend. A circular aperture 54b is provided in stop member 54 precisely in alignment with conduit 42. Aperture 54b has a diameter of reduced dimension to prevent the blunt ends of suppositories from entering said aperture at all, but to permit the beveled ends of the suppositories to enter part way.

Solenoid 55 is energized via a circuit 83 controlled by a microswitch 84 mounted on the back surface of stop plate 54 and having the actuating stem thereof (not visible) extending through aperture 54b in stop plate 54 and just bearly beyond the latter into the end of conduit 42. Thus, upon approach of a suppository for abutment with stop plate 54, whether with the blunt or beveled end thereof, microswitch 84 is triggered to close circuit 83, energize solenoid 55, and hence to cause extension of core piece 56 thereof through aperture 57 in extension piece 54a.

Spaced from peripherally slotted disc 48 is a wheel 58, around the periphery 59 of which, endless belt 52 is also looped. Wheel 58 functions as an idler on a stationary shaft 60 affixed by retention means (not visible) to auxiliary platform 47. Wheel 58 has a second function which will appear hereinafter.

Also affixed to auxiliary platform 47 is a shaft 64 on which is rotatably mounted an impeller wheel 65 having a peripheral array of bristles or tufts 67 extending radially therefrom. Impeller wheel 65 has integral with the lower surface thereof a pulley (not shown) which is drivingly connected by a crossed-over endless belt 66 (shown in phantom in FIG. 5) with pulley 62 affixed to shaft 49.

Affixed to the upper end of stationary shaft 64 of impeller wheel 65 by swage 68 is a plate 69 attached at an intermediate region thereof by a support bar 70 mounted on auxiliary platform 47. Plate 69 has an edge thereof adjacent the web of endless belt 52 at which region plate 69 is provided with a channel member 71 (FIG. 10) which cooperates with belt 52 to complete a conduit 72 having a moving side wall and dimensioned whereby a suppository s, when located therein, is engaged and urged along conduit 72 by said moving side wall 52. Conduit 72 is provided with a flared entrance mouth 73. Plate 69, at its end opposite that at which entrance mouth 73 is located, is provided with a laterally extending vibratory web 74. In the region of attachment of web 74 to plate 69, channel member 71 is no longer enclosed at its top as in FIG. 10, but instead is formed by a continuous web having a cross-sectional contour whereby, as shown in FIG. 11, a surface 75 thereof separates the suppository s thereon from abutment with endless web 52 while the top and upper left side of the conduit (here designated 72') are open. The distal end of conduit 72' has a terminal stop wall 83.

Shaft 60 for wheel 59 is provided at its upper screw-threaded end 76 with a nut 77 and a washer 78 which function as retention means for the upper end of a compression spring 79. The other end of spring 79 abuts and is retained by the upper surface of vibratory web 74, through the aperture 80 of which, shaft 60 extends. The undersurface of vibratory web 74 is provided at the distal end thereof with a cam follower 81 adapted to ride on a camming surface 82 provided on the upper surface of wheel 58. Camming surface 82 is contoured whereby cam follower 81 (and with it web 74 to which it is attached) is gradually raised during counter-clockwise rotation of wheel 58 (FIGS. 5 and 11) and then is dropped abruptly off shoulder 82' to the lower surface to repeat the cycle. Thus, web 74, and with it, the portion of plate 69 from support bar 70 to the end of conduit 72' in plate 69 is given a periodic vibratory motion for a purpose that will appear presently.

A second supporting structure (not shown), similar to supporting structure 2 for main platform 3, is provided for auxiliary platform 47 and is attached to the bottom thereof in the region of wheel 58 to maintain the weight of the various structures on said auxiliary platform 47 and, with said supporting structure 2, to stabilize the entire aligning and orienting apparatus.

Positioned beneath conduit 72' is an indexing table 93, which, as shown in FIGS. 2 and 5, comprises a rotatable platen 94 having a plurality of slots 95 therein adapted to be moved into suppository-receiving alignment with the edge of plate 69 in the region of conduit 72'. As shown in FIG. 4, rotatable platen 94 is affixed by key means 97 to a shaft 96 for rotation therewith and frictionally supported on a bearing plate 98, in turn mounted on a table support 99 having legs 100. On the underside of table support 99 is a second bearing plate 101 for shaft 96, to the bottom of which is affixed a Geneva gear 102 by means of a set screw 103 in collar 104. A leg 100 has a pair of supports 105 for a shaft 106, to the top of which is affixed a Geneva drive wheel 107 for gear 102, by means of a set screw 108 in a collar 109. Beneath upper support 105 and also affixed to shaft 96 by a set screw 110 in a collar 111 is a pulley 112 affixed to the shaft. An endless belt 113 is looped over pulley 112 and a pulley system (not shown) drivingly connected to a pulley 114 affixed to the bottom of wheel 58 (FIG. 11) by means of another endless belt 115.

In the operation of the device, electric motors 20 and 85 are energized via a circuit not shown, as are also the leads 83 to solenoid 55 controlled by microswitch 84. Rotation of drive shaft 23 of motor 20 (in the clockwise direction desired for disc 26) and pulley 24 affixed thereto, impart, via endless belt 25 and pulley 18 affixed to shaft 14, said clockwise rotation of disc 26 mounted on said shaft 14. Rotation of pulley 86 on drive shaft 87 of smaller motor 85, drives endless belt 92 looped around idler pulley 91 and the six rotatable rods 43 of conduit 42, to cause rotation of each of said rods. At the same time, peripherally slotted disc 48 is caused to rotate in counterclockwise direction (FIG. 2) by crossed-over endless belt 63 looped on pulleys 17 and 61. Combination idler and vibrator wheel 58 is caused to rotate in counterclockwise direction (FIGS. 2 and 5) by means of endless belt 52 looped in the peripheral slot 48' of disc 48 affixed to shaft 49. Impeller wheel 65 is caused to rotate on shaft 64 in clockwise direction (FIG. 2) by means of crossed-over endless belt 66 looped on the pulley (not visible) affixed to the bottom of said impeller wheel 65 and on pulley 62 keyed to shaft 49 (FIG. 12).

Upon rotation of pulley 114 affixed to wheel 58 and movement of belt 115 thereon, the driving means (not shown) for endless belt 113 of index table 93 is also put into operation. This results in constant rotation of Geneva wheel 107 and hence intermittent rotation of Geneva gear 102 on shaft 96 and with it rotatable platen 94 thereon synchronously with rotation of wheel 59 and hence with the intermittent vibration of discharge conduit 72'.

With the apparatus in operation as described above, a batch of suppositories are dumped haphazardly on the surface 26b of rotating disc 26. As will be understood, the dumping may be accomplished completely manually or from an overhead hopper, the bottom discharge end of which may be opened intermittently, either manually or automatically in response to demand, to load the surface 26b of disc 26.

At such haphazard loading, some suppositories s will roll into groove g in the bottom region of disc 26 almost at once. Other suppositories will be caused to do so eventually by agitation of the haphazard load of suppositories by the surface 26b of rotating disc 26 with ridges 26c thereon enhancing the agitating effect. As the suppositories s enter groove g, the clockwise rotation disc 26 will tend to carry the suppositories already in groove g, upwardly. In the event the suppositories are spaced in groove g, a lead suppository may slide back in the groove, particularly midway of the upper and lower regions thereof where gravity may have its most direct downward effect, less hampered by frictional engagement of the sides of the suppositories with the interior guide surface (which tends to occur in the lower region particularly) or with the surface of shoulder 28 (which tends to occur in the upper regions particularly). Even when such sliding back may occur, there will be a continual filling of the lower region of groove g with suppositories until there is a continuous line thereof, whereby a positive lifting action is imparted by the lower suppositories in the groove to the upper suppositories with which they are eventually in end-to-end abutment.

If a suppository is not properly aligned in groove g, such as where part of the suppository is in the groove and part is out, gravity then tends to pull such unaligned suppositories downwardly and out of the groove entirely, particularly when said suppositories reach the uppermost region of the disc. Such unaligned suppositories then merely roll or slide back on surface 26b of disc 26 to the bottom region thereof for eventual recycling.

As will appear to those skilled in the art, the inclination of entire assembly 1 may be adjusted to assure the desired action of disc 26 for lifting the suppositories in groove g of said disc depending upon the particular characteristics of both disc and suppositories, e.g., the weight, length, diameter and surface characteristics of the suppositories, and the speed, diameter, and surface characteristics of the disc; as may also be adjusted the inclination of the orienting and discharging structure.

Fully aligned suppositories in groove g are maintained therein in the upper region of disc 26 until they are in effect scooped off the shoulder 28 and ledge 30 of groove g by the ends of rods 43 at the entrance to gravity chute 42. The continuous rotation of rods 43 avoids the possibility of sticking of the suppositories as they move downwardly in chute 42. In this manner, the suppositories proceed in aligned arrangement to the lower region of chute 42 and enter the peripheral slot 48' of disc 48 to proceed along rod extensions 43' and on the lowermost rod extensions particularly until the lead suppository passes over lateral extensions 54a of stop member 54, contacts the microswitch stem protruding through the aperture 54b therein, and abuts stop member 54 at the location of said aperture. Microswitch 84 is immediately triggered to close circuit 83 to solenoid 55 which actuates core-piece 56 to fully extended position (as shown in phantom in FIGS. 2, 5 and 6) thereby pushing the suppository just in abutment with stop member 54 laterally of chute 42 and upwardly toward engagement with endless belt 52.

As is best seen in FIG. 5, when the suppository abuts stop member 54 by its beveled end, that end, after pushing the microswitch stem inwardly to trigger microswitch 84, then enters aperture 54b in stop member 54 part way. Thus, when core-piece 56 of solenoid 55 pushes against the suppository laterally, the beveled end thereof partly in aperture 54b functions as a fulcrum to result in the suppository being flipped over about 90° (FIG. 5), at which time the blunt end of the suppository is received between moving endless belt 52 and bristles 67 of rotating impeller wheel 65, which coact to urge the suppository, now moving blunt end first, into flared entrance mouth 73 of conduit 72. Mouth 73 narrows down to form the passageway wherein one wall is provided by moving endless belt 52 (FIG. 10), whereby the suppository is urged towards the discharge end of conduit 72. At the discharge end of conduit 72, the suppository is no longer in abutment with endless belt 52 (FIG. 11) and is instead positioned in shallow tray 72', in turn positioned immediately over the path of the slots 95 in the rotating platen 94. As wheel 58 rotates, cam follower 81 rides up cam surface 82 and finally drops down shoulder 82' to impart a sharp, generally downward and lateral, vibrational effect to tray 71', whereby the oriented suppository then in the tray is dumped therefrom and into a slot 95 of platen 94 which is momentarily immobile therebeneath, due to synchronization of wheel 58 with cam surface 82 thereon and Geneva wheel 107 via the drive for the latter, including endless belt 113.

When a suppository comes into abutment with stop member 54, blunt end first, to thereby trigger the stem of microswitrh 84 for solenoid 55, the blunt end does not enter the smaller diameter aperture 54b (FIG. 6). Thus, when core-piece 56 is actuated to outward position, the blunt end of the suppository does not function as a fulcrum; instead, the blunt end is lifted generally laterally of stop member 54 and into engagement with endless belt 52 which cooperates with impeller brush 67 to impart forward motion to the suppository into the space defined therebetween and thence into flared entrance mouth 73 of conduit 72. Thus, with the suppository again moved by endless belt 52 with the blunt end first in conduit 72, the same sequence of operation, as just described for the suppositories that required orienting, occurs again, to fill the next positioned slot 95 in platen 94.

In FIGS. 13 and 14, another embodiment of the invention is shown wherein a variant for the guiding and retaining member 31 of the preferred embodiment for the rotatable disc is provided. In this other embodiment, the remaining structures are generally similar to those described for the preferred embodiment and, where shown, the same reference numerals are used to designate the same structures.

As stated, the main distinction here is the variation in the guiding and retaining means. As appears in FIG. 13, such means, instead of comprising a stationary surface affixed to the upper surface of platform 3, comprises a movable endless belt 120 which preferably is flexible in the longitudinal direction, but comparatively much stiffer in the direction of its width, for a purpose that will appear presently. Endless belt 120 is mounted on three idler rollers 121 (on respective shafts 121' affixed to platform 3) and a drive roller 122, and is maintained by a pair of idling retention rollers 123 in frictional abutment with the peripheral surface of ledge 29. Due to the stiffness of the web of endless belt 120 in the width thereof as referred to hereinbefore, the web is maintained in substantially upright relationship to disc 26, as appears in FIG. 14.

For the purpose of positively driving endless belt 120 in the same clockwise direction as that of disc 26, a third pulley 123 is mounted on shaft 14. Drive roller 122 is affixed to a shaft 124 which passes through an aperture 125 in panel 3 and a bearing plate 126 affixed to the underside of platform 3 by means of bolts 127. Affixed to the bottom of shaft 124 by a set screw 129 in a collar 130, is a pulley 128. A crossed-over endless belt 31 is looped around pulleys 123 and 128 thereby to impart the proper direction of movement to endless belt 120.

In the operation of this assembly, which may be associated with an orienting and discharge device as described for the previous embodiment, the rotatable disc 26 may be similarly loaded. In this instance, there is imparted a more positive lifting component to the suppositories in groove g' by application of the lifting force by three separate surface areas on the suppositories therein, e.g., by shoulder 28, upper surface 30 of ledge 29, and the inner surface 120a of belt 120 where it is adjacent ledge 29. This is in contradistinction to the application of the lifting force by only two surface areas, with what may amount to a frictional drag by the third surface area; as occurs in the first embodiment where the guiding and retaining surface is stationary.

The preferred embodiment has been found suitable for aligning the usual cylindrical suppositories. The present embodiment may find particular use where there are special problems for lifting the suppositories or other cylindrical objects due to their size, weight and/or surface characteristics.

As will be understood, various modifications and changes in the specific structures of the embodiments disclosed herein may be accomplished without parting from the scope and spirit of the invention as defined in the appended claims. Merely by way if example, the supporting structures may be of more massive proportions, the driving means may utilize chain drives or gearing rather than the pulley and belt drives shown, the inclination of the parts of the apparatus may be varied for handling the particular objects desired, as referred to hereinbefore, and other means for synchronizing the actions of the aligning, orienting and discharging operations may be utilized. The inclination of the orienting and discharge assembly may be varied independently of the aligning assembly thereby to alter or control the traction effect of the lower inner surface if slot 51 in disc 48 on the suppositories as they are pushed off extension 54a of stop member 54 by core-piece 50. Other changes and modifications will readily occur to those skilled in the art for obtaining the primary advantages of the invention.

I claim:
1. Apparatus for aligning and orienting elongate cartridge-shaped cylindrical objects, one end of which is beveled and the other end of which is blunt, said apparatus comprising:
   (1) a first rotatable disc,
   (2) means supporting said first rotatable disc in an inclined plane,
   (3) a peripheral shoulder extending downwardly from an upper surface of said disc in substantially the direction of the axis of rotation thereof,
   (4) said shoulder terminating in a substantially radially extending lower ledge extending outwardly therefrom,
   (5) guide surface means mounted closely adjacent said extending ledge of said disc and extending around said disc at least from the lower region to the upper region thereof to define in cooperation with said shoulder and said lower ledge a groove having cross-sectional dimensions adapting it to receive and maintain cylindrical objects therein in alignment and substantially tangentially of said shoulder,
   (6) a conduit communicating at its upper receiving end with said groove in the upper region of said disc and having interior cross-sectional dimensions adapting it for receiving the aligned objects from the groove and conducting them in such disposition to the lower discharge end of said conduit,
   (7) a second rotatable disc,
   (8) means supporting said second rotatable disc in an inclined plane substantially parallel to the inclined plane of said first rotatable disc,
   (9) said second rotatable disc having a peripheral slot therein,
   (10) a pulley disposed in spaced relation to said second disc having a groove therein,
   (11) an endless belt looped about said second disc and said pulley in the slot and in the groove thereof respectively,
   (12) said lower discharge end of said conduit being disposed within the slot of said second disc,
   (13) means for rotating said first and said second discs,
   (14) stop means mounted in the path of said conduit at said lower discharge end thereof,
   (15) said stop means being provided with an aperture aligned axially of said lower discharge end if said conduit and dimensioned to permit partial entry of the bevelled ends of the cartridge-shaped objects and to prevent entry of the blunt ends of the cartridge-shaped object,

(16) a reciprocable push-rod mounted adjacent said lower discharge end and said apertured stop means,
(17) means for reciprocating said push-rod transversely of said lower discharge end and into the slot in said second disc and toward said endless belt, and
(18) means for adjusting the inclination of said first and said second discs simultaneously.

2. Apparatus for aligning and orienting elongate cartridge-shaped cylindrical objects as claimed in claim 1 wherein means define a passageway in object-receiving relationship with said lower discharge end of said conduit, said apertured stop means and said reciprocable push-rod, said means comprising at least part of the outer surface of said endless belt looped about said second disc and said pulley, and said means for adjusting the inclination of said first and said second discs simultaneously also functions to adjust the inclination of said passageway and said pulley at the same time.

3. Apparatus for aligning and orienting elongate cartridge-shaped cylindrical objects as claimed in claim 2 wherein means are provided for impelling objects, that have been pushed off said lower discharge end of said conduit by said reciprocable push-rod at said apertured stop means, into said passageway.

4. Apparatus for aligning and orienting elongate cartridge-shaped cylindrical objects as claimed in claim 2 wherein said passageway is provided with a vibratory discharge end, said vibratory discharge end is positioned over a movable platen, and said means for adjusting simultaneously the inclination of said first and second discs, said passageway and said pulley, also functions to adjust the inclination of said vibratory discharge end of said passageway at the same time, thereby to control the discharge of objects from said discharge end to said movable platen.

5. Apparatus for aligning elongate cylindrical objects, said apparatus comprising:
(1) rotatable disc means having a ridged surface,
(2) means supporting said rotatable disc means in an inclined plane and comprising means for adjusting the inclination of said supporting means,
(3) a peripheral shoulder extending downwardly from an upper surface of said disc means in substantially the direction of the axis of rotation thereof,
(4) said shoulder terminating in a substantially radially extending lower ledge extending outwardly therefrom,
(5) guide surface means mounted closely adjacent said extending ledge of said disc means and extending around said disc means at least from the lower region to the upper region thereof to define in cooperation with said shoulder and said lower ledge a groove having cross-sectional dimensions adapting it to receive and maintain cylindrical objects therein in alignment and substantially tangentially of said shoulder, and
(6) conduit means communicating with said groove in the upper region of said disc means and having interior cross-sectional dimensions adapting it for receiving the aligned objects from the groove and conducting them in such disposition, said conduit means comprising a wall disposed with the upper surface of the lower portion thereof in the plane of said ledge, said wall comprising a plurality of rotatable rods extending in the axial direction of said conduit means, and means for rotating said rotatable rods.

6. Apparatus for aligning and orienting elongate cartridge-shaped cylindrical objects, said apparatus comprising:
(A) means for aligning elongate cylindrical objects,
(B) means for conducting aligned objects away from said aligning means, said conducting means having a discharge end,
(C) means for orienting the aligned cylindrical objects, said orienting means comprising:
(1) a rotatable disc having a peripheral slot therein,
(2) a pulley disposed in spaced relation to said disc,
(3) an endless belt looped about said disc and said pulley in the slot and the groove thereof respectively,
(4) said discharge end of said conducting means being disposed within the slot of said disc,
(5) stop means mounted in the path of said conducting means at said discharge end thereof,
(6) said stop means being provided with an aperture aligned axially of said discharge end of said conducting means and dimensioned to permit partial entry of the bevelled ends of the cartridge-shaped objects and to prevent entry of the blunt ends of the cartridge-shaped objects,
(7) a reciprocable push-rod mounted adjacent said discharge end and said apertured stop means, and
(8) means for reciprocating said push-rod transversely of said lower discharge end and into the slot in said disc and toward said endless belt.

7. Apparatus for aligning and orienting elongate cartridge-shaped cylindrical objects as claimed in claim 6 wherein said means for reciprocating said push-rod transversely of said discharge end is rendered operative each time an object abuts said stop means.

8. Apparatus for aligning and orienting elongate cartridge-shaped cylindrical objects as claimed in claim 6 wherein means define a passageway in object-receiving relationship with said discharge end of said conducting means, said apertured stop means and said reciprocable push rod, said means comprising at least part of the outer surface of said endless belt looped about said disc and said pulley.

9. Apparatus for aligning and orienting elongate cartridge-shaped cylindrical objects as claimed in claim 8 wherein means are provided for impelling objects, that have been pushed off said discharge end of said conducting means by said reciprocable push-rod at said apertured stop means, into said passageway.

10. Apparatus for aligning and orienting elongate cartridge-shaped cylindrical objects as claimed in claim 8 wherein said passageway is provided with a vibratory discharge end, and said vibratory discharge end is positioned over a movable platen provided with a plurality of receptacles each adapted to receive a single oriented object.

11. Apparatus for aligning and orienting elongate cartridge-shaped cylindrical objects as claimed in claim 10 wherein means are provided for moving said platen intermittently for positioning a receptacle thereof in object-receiving relationship beneath said vibratory discharge end, means are provided for vibrating said vibratory discharge end intermittently, and both said means are synchronized so that said vibratory discharge end is vibrated only when said platen is stationary with a receptacle thereof positioned in object-receiving relationship with said vibratory discharge end.

12. Apparatus for aligning elongate cylindrical objects, said apparatus comprising:
(1) rotatable disc means comprising a flat upper surface,
(2) a peripheral shoulder extending downwardly from said flat upper surface of said disc means in substantially the direction of the axis of rotation thereof,
(3) said shoulder terminating in a substantially radially extending lower ledge extending outwardly therefrom,
(4) guide surface means mounted closely adjacent said extending ledge of said disc means and extending around said disc means at least from the lower region to the upper region thereof to define in cooperation with said shoulder and said lower ledge a groove having cross-sectional dimensions adapting it to receive and maintain cylindrical objects therein in alignment and substantially tangentially of said shoulder, (5) conduit means communicating with said groove in the upper region of said disc means and having interior cross-sectional dimensions adapting it for receiving the aligned objects from the groove and conducting them in such disposition, (6) means supporting said rotatable disc means and said guide surface means in an inclined plane and comprising means for adjusting the inclination of said supporting means, (7) driving means for said rotatable disc means, said driving means comprising means operatively connected to said rotatable disc means for driving the latter regardless of the inclination to which it has been adjusted.

References Cited by the Examiner
UNITED STATES PATENTS 3,119,487   1/64   Wyle _____ 221—173

SAMUEL F. COLEMAN, *Primary Examiner.*

WILLIAM B. LA BORDE, *Examiner.*